No. 610,136. Patented Aug. 30, 1898.
T. R. GRIFFITH.
COAL CRUSHER.
(Application filed Dec. 18, 1896.)
(No Model.) 2 Sheets—Sheet 1.
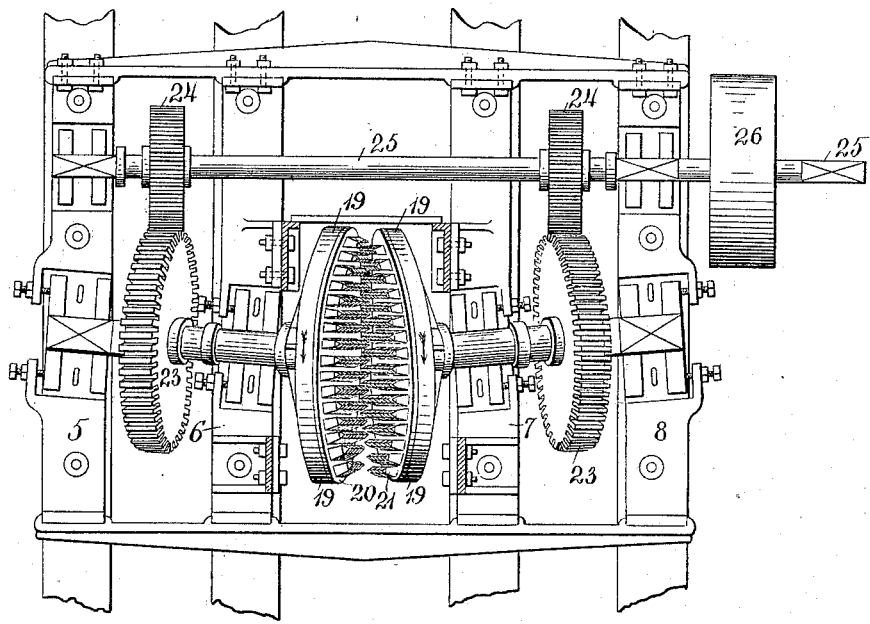
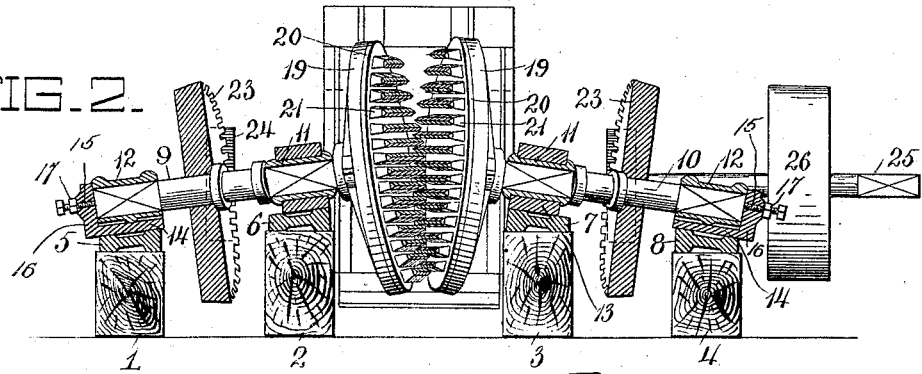
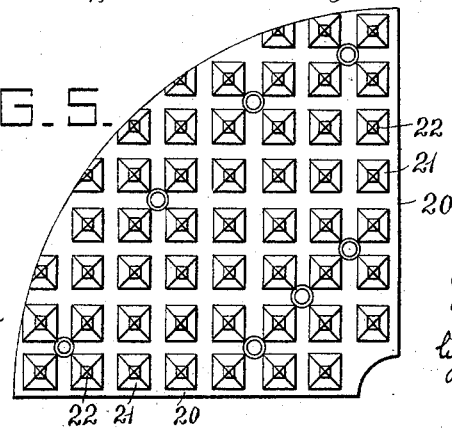
WITNESSES
INVENTOR
Thomas R. Griffith
by John Wedderburn
Attorney No. 610,136.
T. R. GRIFFITH.
COAL CRUSHER.
(Application filed Dec. 18, 1896.)
(No Model.)
Patented Aug. 30, 1898.
2 Sheets—Sheet 2.
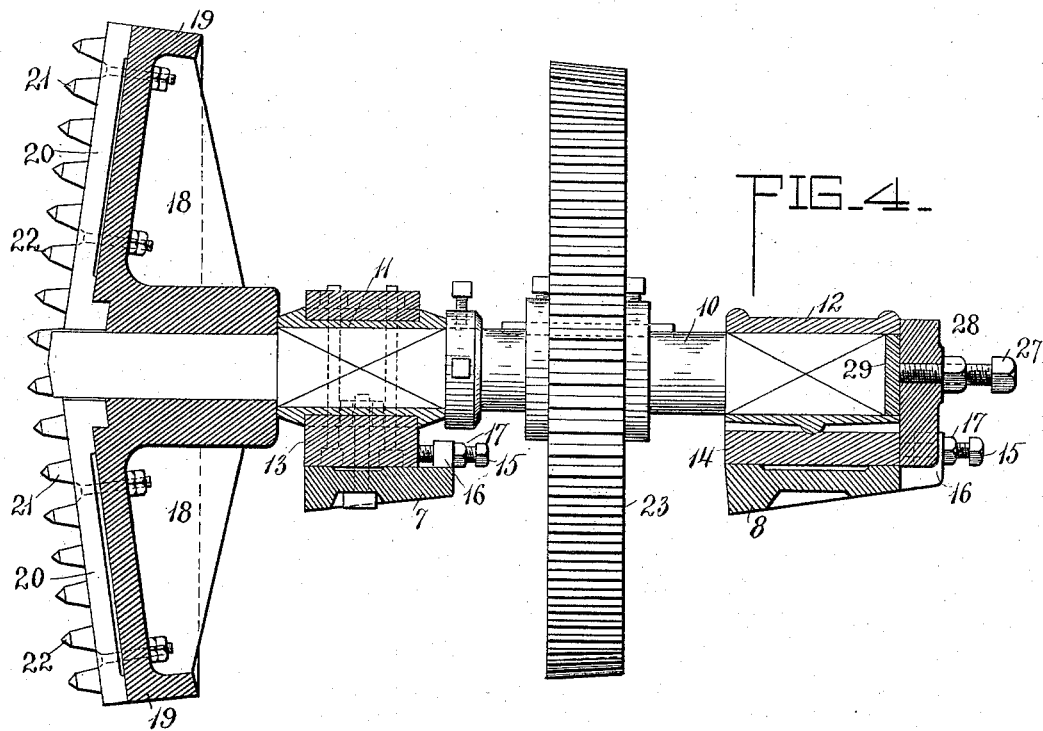
FIG. 4.
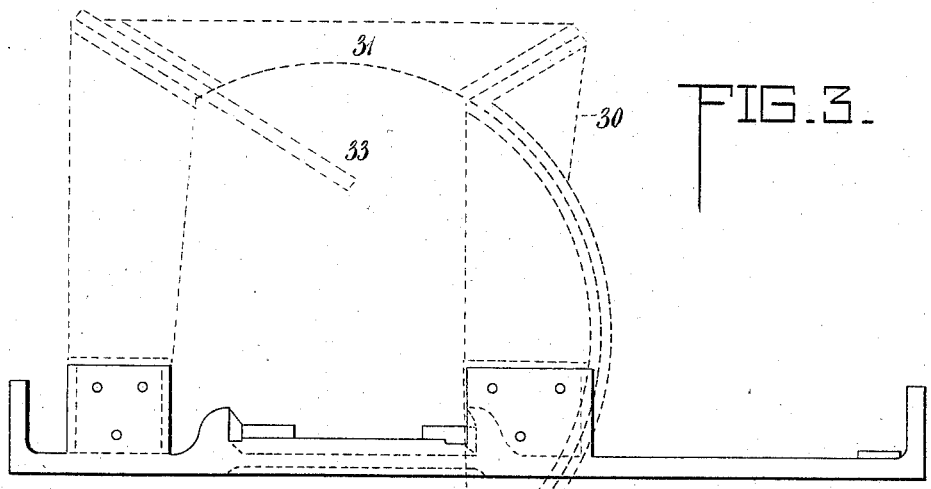
FIG. 3.
FIG. 7.    FIG. 6.
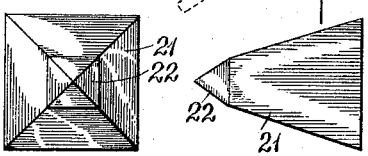
WITNESSES
W. G. Allen.
James F. Duhamel.
INVENTOR
Thomas R. Griffith,
by John Wedderburn
Attorney

UNITED STATES PATENT OFFICE.

THOMAS R. GRIFFITH, OF PITTSTON, PENNSYLVANIA.

COAL-CRUSHER.

SPECIFICATION forming part of Letters Patent No. 610,136, dated August 30, 1898.

Application filed December 18, 1896. Serial No. 616,186. (No model.)

*To all whom it may concern:*

Be it known that I, THOMAS R. GRIFFITH, a citizen of the United States, residing at Pittston, in the county of Luzerne and State of Pennsylvania, have invented certain new and useful Improvements in Coal-Crushers; and I do hereby declare the following to be a full, clear, and exact description of the invention, such as will enable others skilled in the art to which it appertains to make and use the same.

My invention relates to improvements in crushing-machines, and has for its object the production of a simple, durable, and efficient device for the reduction of coal, mineral ore, or the like to pulverized form from the large lumps brought from the mines.

The invention consists of the construction, combination, and arrangement of parts, which will be more fully hereinafter described and claimed.

In the accompanying drawings, forming a part of this specification, Figure 1 is a top plan view of my device with the housing and hopper removed. Fig. 2 is a front elevation of my device, partly in section. Fig. 3 is a view of one of the sole-plates, showing the relation thereto of the housing and hopper. Fig. 4 is a central vertical section of one of the crusher-disks and its connected mechanism, the shaft and gear-wheel being shown in elevation. Fig. 5 is a detail view of one of the detachable tooth-segments. Fig. 6 is a side elevation, and Fig. 7 is a top plan view, of one of the teeth.

Referring to the numerals on the drawings, 1, 2, 3, and 4 indicate a number of supporting-girders located substantially parallel and supporting the sole-plates 5, 6, 7, and 8. The center girders 2 and 3 are preferably somewhat higher than the end girders 1 and 2, and the sole-plates are inclined transversely for the purpose of sustaining in oppositely-inclined relation a pair of inclined crusher-shafts 9 and 10, mounted, respectively, in suitable journal-boxes 11 and 12, carried by adjustable journal-supporting plates 13 and 14, supported upon the sole-plates 3. The journal-supporting plates are adjustable with respect to the sole-plates through the medium of adjustment-screws 15, secured at their extremities to said supporting-plates and passing through internally-screw-threaded lugs 16, projecting from one side of the sole-plates, lock-nuts 17 being provided for fixing the plates 13 and 14 in their adjusted positions. By means of this particular form of adjustable journal longitudinal adjustment of the shafts 9 and 10 is provided for. Upon the adjacent extremities of the crusher-shaft are mounted crusher-disks 18, provided with contiguous convex faces 19, upon which are bolted or otherwise detachably secured a plurality of segmental toothed plates 20, from the face of which project the crusher-teeth 21, the bodies of which are of frusto-pyramidal form and are surmounted by chilled apices 22 of pyramidal form, the edges and sides of which are disposed at an angle with respect to the edges and sides of the teeth.

By reference to Fig. 1 it will be observed that the crusher-shafts are inclined laterally as well as vertically, the object of which is to make the line of travel of the material to be crushed from the widest point of entrance between the crusher-disks to the point of closest contiguity of the crusher-disks at an angle of about sixty degrees from the horizontal, the teeth upon the disks at this point intermeshing sufficiently to insure the crushing or grinding of the mineral to the finest grade.

23 23 indicate a pair of bevel-gears keyed upon the crusher-shaft intermediate the journal-boxes 11 and 12 and meshing with gear-wheels 24 24, keyed upon the power-shaft 25, journaled in suitable bearings upon the sole-plates and provided with a belt-pulley 26.

It will be observed that coal fed between the crusher-disks from above will be carried by the rotation of said disks in the direction indicated by the arrows in Fig. 1 from the point of entrance to the point of closest contiguity between the disks, being meanwhile gradually reduced in size, and finally escape at a point where the walls of the disks begin to diverge, which point by reason of the vertical and horizontal inclination of the shafts is beyond and below the point of entrance to the crusher-disks. The adjustment of the disks toward or from each other to accommodate materials of various kinds and to regulate the grade or degree of pulverization is accomplished through the adjustment of the journal-supporting plates 13 and 14 by means of the adjustment-screws 15 in a manner hereinbefore described.

For the purpose of taking up wear or for accomplishing a particularly fine adjustment I provide end-thrust adjustment-screws 27, screwing through vertical extensions 28 upon the plates 14 and bearing against a Babbitt or other antifriction plate 29 in contact with the outer ends of the shafts.

30 indicates a suitable housing inclosing the crusher-disks and provided at its upper end with a hopper 31, the front wall of which is extended to a point immediately over the center of the disks and designed to direct the material to be crushed to the disks at a point where it will be directed by the teeth and gradually forced in the direction of the convergent relation of the toothed segments, a suitable deflector-plate being provided at the bottom of the housing and upon the side opposite to the extended hopper-plate 33.

In operation power is applied to the shaft 25 through the belt-pulley 26 and rotary motion of the crusher-shafts and disks is imparted through the gears 23 and 24. Coal or the like is fed into the hopper and is precipitated between the teeth of the crusher-disks, which gradually approach and reduce the lumps until the mass is finally ejected from the bottom of the crusher in a pulverized form, the grade of reduction being, however, determinable by the adjustment of the disks toward or from each other by what I will call the "disk-adjusting mechanism."

As the apices 22 of the teeth 29 are so formed that the sides and edges thereof lie at an angle to the sides and edges of the bodies of the teeth, it will be evident that the entire crushing action of the teeth will be effected by the angularly-arranged sides of the chilled apices.

It will be apparent that I have produced a durable and efficient device by means of which coal, mineral ore, or the like may be thoroughly crushed and reduced to the required grade without waste and without the necessity for passing the material through the crusher more than a single time.

I do not desire to limit myself to the details of construction herein shown and described, but reserve to myself the right to change, modify, or vary such details within the scope of my invention.

Having thus described my invention, what I claim as new, and desire to secure by Letters Patent, is—

In a crushing-machine of the character described, the combination with a pair of shafts provided with toothed crusher-disks, journal-boxes for said shafts, journal-supporting plates, means for adjusting the journal-boxes with respect to said plates, sole-plates supporting the journal-supporting plates, and mechanism for adjusting the relations of said sole-plates and journal-supporting plates, substantially as specified.

In testimony whereof I have signed this specification in the presence of two subscribing witnesses.

THOMAS R. GRIFFITH.

Witnesses:
W. F. STALEY,
H. T. WEBER.